United States Patent
Johnson et al.

(10) Patent No.: US 12,521,217 B2
(45) Date of Patent: Jan. 13, 2026

(54) ORAL CARE DEVICE WITH SENSING FUNCTIONALITY

(71) Applicant: KONINKLIJKE PHILIPS N.V., Eindhoven (NL)

(72) Inventors: Mark Thomas Johnson, Arendonk (BE); Lutz Christian Gerhardt, Eindhoven (NL); Bart Gottenbos, Budel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 468 days.

(21) Appl. No.: 18/027,414

(22) PCT Filed: Sep. 9, 2021

(86) PCT No.: PCT/EP2021/074759
§ 371 (c)(1),
(2) Date: Mar. 21, 2023

(87) PCT Pub. No.: WO2022/058227
PCT Pub. Date: Mar. 24, 2022

(65) Prior Publication Data
US 2023/0329849 A1    Oct. 19, 2023

(30) Foreign Application Priority Data
Sep. 21, 2020  (EP) .................... 20197238

(51) Int. Cl.
*A61C 17/22*       (2006.01)
*A46B 15/00*      (2006.01)
(Continued)

(52) U.S. Cl.
CPC ........ *A61C 17/221* (2013.01); *A46B 15/0032* (2013.01); *A61B 5/0507* (2013.01); *A61B 8/06* (2013.01); *A46B 2200/1066* (2013.01)

(58) Field of Classification Search
CPC .......... A61B 5/05; A61B 5/0507; A61B 5/053; A61B 8/06; A61B 5/02042; A61C 17/22;
(Continued)

(56) References Cited

U.S. PATENT DOCUMENTS 8,180,427 B2   5/2012  Phua et al.
10,201,701 B2  2/2019  Levi
(Continued)

FOREIGN PATENT DOCUMENTS

CN   105662630 A   6/2016
CN   110192929 A   9/2019
(Continued)

OTHER PUBLICATIONS

International Search Report and Written Opinion Dated Nov. 2, 2021 for International Application No. PCT/EP2021/074759 Filed Sep. 9, 2021.
(Continued)

*Primary Examiner* — Keith M Raymond
*Assistant Examiner* — Milton Truong (57) ABSTRACT

An oral care system for sensing blood in an oral cavity and in gum tissue. The sensing is performed magnetically using a magnetic field source (16) and magnetic sensing arrangement (18) incorporated into a cleaning or treatment portion of an oral care device (e.g. a brush head of a toothbrush or mouthpiece part of a brushing mouthpiece device). The field source generates (16) a reference field and the sensing arrangement (18) is arranged to sense the field strength of the reference field at one or more spatial points. Since blood is magnetic, when brought into the reference field, it magnetically interacts with the field, which may alter field strength, field shape, or flux distribution. This enables presence of blood to be detected. It also allows for detecting specific oral features or disease states associated with pres- (Continued)

ence of blood or abnormal amounts or concentrations of blood. For example, this can be based on application of detection criteria which relate to one or more properties of the sensed field.

17 Claims, 4 Drawing Sheets

(51) Int. Cl.
  *A61B 5/0507* (2021.01)
  *A61B 8/06* (2006.01)
(58) Field of Classification Search
  CPC .............. A61C 17/221; A46B 15/0032; A46B 2200/1066
  See application file for complete search history.

(56) References Cited

U.S. PATENT DOCUMENTS

| | | | |
|---|---|---|---|
| 2009/0203988 A1* | 8/2009 | Phua | G01F 1/56 600/409 |
| 2016/0367188 A1* | 12/2016 | Malik | G16H 40/67 |
| 2017/0209692 A1* | 7/2017 | Levi | A61N 1/40 |
| 2020/0022488 A1 | 1/2020 | Den Hamer et al. | |
| 2020/0069042 A1 | 3/2020 | Masculo et al. | |
| 2020/0146435 A1 | 5/2020 | Rmaile et al. | |

FOREIGN PATENT DOCUMENTS

| | | | |
|---|---|---|---|
| WO | 2017139256 A1 | 8/2017 | |
| WO | 2017216606 A1 | 12/2017 | |
| WO | 2018065373 A1 | 4/2018 | |
| WO | WO-2018087627 A1 * | 5/2018 | ........... A61C 17/221 |
| WO | 2020161604 A1 | 8/2020 | |

OTHER PUBLICATIONS

"Met: A Magneto-Inductive Sensing Based Electric Toothbrushing Monitoring System" (Anonymous Author(s) ) Hua Huang profile imageHua Huang , Shan Lin profile imageSha.
https://www.youtube.com/watch?v=orTsVwZLC10 ToothWave—Way Beyond Brushing Silk'n Australia.
Yang Zhang et al., "Mechanism of Magnetic Pulse Wave Signal for Blood Pressure Measurement", Scientific Research Publishing, J. Biomedical Science and Engineering 2016, 9,29-36, Published Sep. 23, 2016. https://file.scirp.org/pdf/JBiSE_2016092116220222.pdf.
Sang-Hyan Park et al., "Detection of Magnetic Nanoparticles and Fe-hemoglobin inside Red Blood Cells by Using a Highly Sensitive Spin Valve Device", Journal of Magnetics 13(1), 30-33 (2008), Feb. 19, 2008.
NVE Corporation, "NVE Introduces Low Voltage Nanopower Magnetic Sensors for Medical Devices". Product Announcement, Eden Prairie, Minn.—Jun. 23, 2010.
Kerdvongbundit, Varunee. et al. "Blood flow and human periodontal status". Odontology 90(1):52-56 (2002). The Society of the Nippon Dental University 2002.

* cited by examiner

ORAL CARE DEVICE WITH SENSING FUNCTIONALITY

This application is the U.S. National Phase application under 35 U.S.C. § 371 of International Application No. PCT/EP2021/074759, filed on Sep. 9, 2021, which claims the benefit of EP Application Serial No. 20197238.7, filed Sep. 21, 2020. These applications are hereby incorporated by reference herein.

FIELD OF THE INVENTION

The present invention relates to an oral care device for performing an oral cleaning and/or treatment function.

BACKGROUND OF THE INVENTION

WO2018065373A1 discloses a tracking system for recording the position of a toothbrush during toothbrushing, the system comprising: a toothbrush, the toothbrush comprising: a head portion; a handle portion; an orientation sensor; a sensor for detecting contact between the toothbrush and the jaw of a user; and a magnetic sensor; and a magnetic field generator; wherein: the magnetic sensor detects the absolute position of the toothbrush within the field created by the magnetic field generator.

Regular monitoring of oral health is important to prevent development of disease or abnormality in the gums or teeth. It is known to incorporate features in oral care devices such as toothbrushes to monitor brushing technique and provide feedback to a user to improve technique, with the aim of preventing decline in oral health through caries and gum disease.

However, such features alone cannot always prevent problems in the mouth occurring, and regular monitoring is important for early detection and treatment. For example, gingivitis is a disease of the gums and cannot always be avoided through brushing technique. Other conditions can also cause gum inflammation, accumulation of blood (e.g. at gum-line between teeth and gums, or perfused in inflamed tissue) and bleeding into the mouth.

It would be of value to provide an oral care device capable of detecting such abnormal conditions or features in the mouth during use of the oral care device so that a user can be alerted to potential problems.

SUMMARY OF THE INVENTION

The invention is defined by the independent claims. The dependent claims define advantageous embodiments.

According to an aspect of the invention, there is provided an oral care system. The system comprises a cleaning and/or treatment portion for an oral care device, at least a section of which is for being received in use in an oral cavity of a user for a cleaning or treatment function.

The cleaning or treatment portion comprises a magnetic field source for generating a reference magnetic field the oral cavity when received therein, and a magnetic field sensing arrangement, arranged to detect a magnetic field strength of the reference field, or changes therein, at one or more spatial locations.

The system further includes a processing arrangement, arranged to receive a sensor output from the magnetic field sensing arrangement. It is adapted to perform sensing of blood in gum tissue or in the oral cavity, based on analysis of the sensor output.

Preferably, the magnetic field source and the magnetic field sensing arrangement are comprised by said at least section of the cleaning and/or treatment portion for being received in use in the oral cavity of the user.

Preferably, the magnetic field sensing arrangement is different to the magnetic field source.

Preferably, the magnetic field sensing arrangement is arranged to detect the magnetic field strength at one or more spatial locations in the oral cavity.

The processing arrangement may be adapted to detect one or more pre-determined features, detection of each feature being based on application of one or more pre-defined detection criteria related to the sensor output. For example, the detection criteria may relate to characteristics or properties of the sensor output such as a magnitude of detected field strength, a spatial distribution or pattern or field strength, and/or temporal variations in field strength matching a defined temporal pattern. These are just illustrative examples. The features may be anatomical or physiological features.

The general concept of embodiments of the invention is the use of magnetic fields for sensing of blood in the oral cavity or gum tissue, and the detection of features (e.g. oral health-related features) based on this sensing.

Due to the iron content in hemoglobin, blood has magnetic properties. It is the only magnetic fluid in the body. This allows for sensing and detection of blood magnetically. Many oral pathologies or abnormalities are characterized by an unusual presence or concentration of blood. For example, gingivitis or other gum disease can cause gum inflammation which is characterized by an unusual accumulation of blood in the gum tissue, which causes swelling and redness. There is a greater concentration of blood (amount of blood per unit volume of gum) in the inflamed area of the gum than would be present in healthy gum. Furthermore, many oral defects can cause bleeding, e.g. gum or tongue lesions, gum disease, tooth problems. In this case, the fluids of the mouth contain blood when in a healthy state, they should not contain blood. There may additionally or alternatively be an accumulation of droplets of blood on the surfaces in the mouth e.g. at a gum-line between teeth and gums or in pockets or blisters in the oral cavity.

When blood is present in the reference magnetic field, its magnetic properties cause it to interact with the field, distorting the shape of the field, or altering distribution of field strength. This alteration to the reference field can be detected with a magnetic sensor, and, dependent upon the characteristics of the sensing signal, different blood-related features can be detected and distinguished.

In general, the reference field may be a static or time-varying/alternating field. The field source can be passive (a permanent magnet) or active (an electromagnetic source).

According to one or more embodiments, the processing arrangement may be adapted to detect one or more (health or medical) abnormalities in the gum tissue or oral cavity based on the analysis of the sensor output and for example based on one or more detection criteria related to the sensor output. For example, it may be adapted to detect abnormal presence or concentration of blood in gum tissue or in the oral cavity, the detection based on analysis of the sensor output.

According to one or more embodiments, the processing arrangement may be adapted to detect at least one of: inflammation (i.e. excess blood perfusion) or a condition indicate thereof, static blood on a surface of the gums, static blood at a gum-line between teeth and gums, or bleeding. It may also be operable to detect an accumulation or pooling of blood beneath a tissue surface, for example in a blister. The processing arrangement may be operable to detect a plurality of different types or classes of abnormality based on blood sensing, for example each associated with a respective set of detection criteria related to (characteristics of) the sensor output signal.

In accordance with one or more embodiments, the processing arrangement may be adapted to detect spatial and/or temporal variations in the magnetic field detected at the magnetic sensing arrangement. One or more features may be detected based on the spatial and/or temporal variations in the magnetic field strength. If the field is an alternating field, detection of a feature may be based on spatial or temporal variations in the baseline or envelope or amplitude of the magnetic signal.

For example, detection of a feature or abnormality may be based on detection criteria which relate to a spatial pattern or distribution of field strength across a plurality of sensed locations (e.g. an asymmetry). Alternatively, it may be based on sensing a temporal fluctuation in field strength at a single (or multiple) locations, indicative of the sensor passing over a particular location containing the relevant blood feature or abnormality.

With regard to the spatial variation option, in one set of embodiments, the magnetic field sensing arrangement comprises a plurality of magnetic field sensing elements, disposed spaced from one another. A spatial variation in the magnetic field strength may be detected based on variations in magnetic field strength detected by different of the sensing elements.

A presence or localized accumulation of blood in a certain area may be detected based on an asymmetry or disparity between the detected field strengths at the different spatial locations. In some examples, the processing arrangement is adapted to estimate a location of a site of a feature or abnormality based on the detected spatial variation in the sensed magnetic field between the spatial locations.

With regards to the temporal variation option, in one set of embodiments, the processing arrangement is arranged to receive a sensor signal of magnetic field strength over time for the one or more locations, and detect a feature based on a detected temporal fluctuation in the signal.

In this mode of detection, the signal is monitored whilst a user moves the oral care device cleaning and/or treatment portion around the mouth. A fluctuation indicates presence of blood accumulation (or other abnormality) at the instant location of the field sensing arrangement at the time of detecting the fluctuation.

In some embodiments, detection of a feature or abnormality may be based on a combination of spatial and temporal variations in field strength. For example, detection of a feature, such as an abnormal presence or concentration of blood, may be based on detecting temporal variations or changes in a spatial field distribution across the different sensing spatial locations.

In accordance with one or more embodiments, the oral care system may further comprise an electromagnetic cleaning and/or treatment arrangement. This comprises: a conductor arrangement, comprising one or more conductive elements (e.g. single or multi-loop coils, or electrodes. It further comprises a signal generator adapted to generate a radiofrequency (RF) and/or microwave frequency alternating electromagnetic field when said generator is operatively coupled to the conductor arrangement comprising one or more conductive elements. It preferably may further comprise a controller, which is operatively coupled with the generator. The controller may be operable in at least a cleaning or treatment mode in which the controller is adapted to control the signal generator to generate an alternating electromagnetic field using the conductor arrangement, for performing an oral cleaning or treatment function when the conductor arrangement is received in the oral cavity.

Electromagnetic fields, particularly at radio frequencies (RF), are known to be effective for use in cleaning or treatment of tooth surfaces or gum tissue. For example, they can loosen biofilm coverings on tooth surfaces.

In different embodiments, the EM cleaning and/or treatment arrangement (abbreviated herein: EMCTA), and the field source and field sensing arrangement, may cooperate or interact functionally or structurally to provide synergistic effects, or to reduce components. They may share certain components, or they may interact electromagnetically. A summary of the different options will now be outlined.

In one set of embodiments, the EMCTA may be provided functionally and structurally separate from the sensing components.

Alternatively, in at least one set of embodiments, the signal generator and conductor of the EMCTA may provide the magnetic field source for generating the reference magnetic field. In other words, the field generating components of the EMCTA are harnessed for the dual function of generating the reference field in this option.

Within this set of embodiments, optionally, in one subset of embodiments, the magnetic component of the alternating EM field generated in the cleaning or treatment mode provides the reference magnetic field. In other words, the same field used for cleaning or treatment is also simultaneously harnessed as the reference field for performing the sensing.

Alternatively, in a different subset of embodiments, the EMCTA is used to generate the reference field, but it does this in a different mode or phase, so that the reference field is different to the cleaning or treatment field. For example, the controller is further selectively configurable in a blood sensing mode in which the signal generator is controlled to generate a different magnetic or electromagnetic field using the conductor arrangement, for use as the reference field. The different field may be a DC magnetic field in some examples. This may be achieved through switching in a rectifier to the generator circuit and driving a coil with a DC current. Additionally or alternatively, the different field may be a lower frequency alternating field to the cleaning and/or treatment field.

In compatibility with any of the above described options, in accordance with one or more embodiments, the magnetic field sensing arrangement may be arranged to be powered through inductive or capacitive coupling of energy from the EM field generated by the signal generator and conductor arrangement.

Depending upon the particular feature or abnormality which is to be detected, the processing of the sensor signal and/or the detection criteria applied may vary.

In some embodiments, analysis of the sensor output is based on filtering or other spectral processing or analysis. For example, in accordance with one or more embodiments, the processing arrangement may receive a sensor signal of magnetic field strength over time for the one or more locations from the sensing arrangement, and is adapted to process the signal to remove frequency components within a pre-defined range of frequency components.

In one set of examples, the pre-defined range of frequency components may be a range of frequency components associated with a defined heart rate frequency. This embodiment is helpful for distinguishing static blood from flowing blood. This is useful in detection of an accumulation of droplets of blood on the surfaces in the mouth e.g. at a gum-line between teeth and gums or in pockets or blisters in the oral cavity.

In accordance with one or more embodiments, the processing arrangement may be arranged to receive a sensor signal of magnetic field strength over time for the one or more locations from the sensing arrangement, and is adapted to detect presence of blood in fluids within the oral cavity based on processing the magnetic field signal to extract frequency components above 10 Hz.

Some oral care devices may actuate an oscillation of the cleaning and/or treatment portion (abbreviated herein: CTP), for example a powered toothbrush. In the presence of oscillation of the CTP, fluids in the mouth exhibit turbulence motion with high frequencies. Blood in the fluid will also move at this high frequency. Signal components associated with movement of (magnetic) blood in the fluids can be isolated by selecting just high frequencies, e.g. above 10 Hz.

In accordance with one or more embodiments, the processing arrangement may be arranged to receive a sensor signal of magnetic field strength over time for the one or more locations from the sensing arrangement, and to detect presence of inflamed gum tissue (or a condition indicative thereof) based on an amplitude in the signal and/or based on a level of a baseline of the signal This can be useful for detecting inflamed tissue (or a condition indicative thereof). For example, gingivitis has been found to be associated with at least 50% increased blood flow in the area of the affected tissue. This may lead to an increase in the amplitude of the oscillations. However, it may in some cases lead to a decrease in the amplitude of oscillations, since more blood is retained in the inflamed region between blood pulses, reducing the oscillation amplitude.

Gingivitis is also associated with a larger than typical accumulation of a blood in region of the inflamed gum tissue, which leads to a detectable rise also in the baseline of the signal.

In accordance with one or more embodiments, the oral care system may comprise the oral care device, and wherein the oral care device comprises the cleaning and/or treatment portion and the processing arrangement. Non-limiting examples of an oral care device include a powered toothbrush, a brushing mouthpiece device, an oral irrigator and a powered flossing device. Optionally, the cleaning and/or treatment portion may be releasably coupleable with a further portion of the oral care device, wherein the further portion comprises the processing arrangement.

Examples in accordance with a further aspect of the invention provide a method of sensing in an oral cavity of a user. The method comprises: generating a reference magnetic field in the oral cavity; sensing a magnetic field strength of the reference field at one or more spatial locations within the oral cavity to generate a sensing output signal; performing sensing of blood in gum tissue or in the oral cavity, based on analysis of the sensing output signal; and generating a data output based on a result of the sensing.

Examples in accordance with a further aspect of the invention provide a computer program product comprising computer program code, the computer program code being executable on a processor. When the processor is operatively coupled with a magnetic field sensing arrangement arranged to sense a magnetic field strength or changes therein at one or more spatial locations in an oral cavity, responsive to generation of a reference magnetic field in the oral cavity by a field source, the code is configured to cause the processor to: receive a sensor output from the magnetic field sensing arrangement indicative of a magnetic field strength or changes therein of the reference field at one or more spatial locations in the oral cavity; perform sensing of blood in gum tissue or in the oral cavity, based on analysis of the sensor output; and generate a data output indicative of the sensing.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying schematic drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an oral care system for sensing blood in an oral cavity and in gum tissue. The sensing is performed magnetically using a magnetic field source and magnetic sensing arrangement incorporated into a cleaning or treatment portion of an oral care device (e.g. a brush head of a toothbrush or mouthpiece part of a brushing mouthpiece device). The field source generates a reference field and the sensing arrangement is arranged to sense the field strength of the reference field at one or more spatial points. Since blood is magnetic, when brought into the reference field, it magnetically interacts with the field, which may alter field strength, field shape, or flux distribution. This enables presence of blood to be detected. Since the field sensor provides a quantitative output, it also allows for more specificity in sensing. In particular, it allows for detecting specific oral blood-related features, e.g. abnormalities or disease states associated with abnormal presence of blood or abnormal amounts or concentrations of blood. For example, this can be based on application of detection criteria which relate to one or more properties of the sensed field (e.g. magnitude, frequency composition, temporal variations, or spatial variations across an area). These criteria can for example be pre-determined in advance and known to be associated with particular oral features, and then applied in use.

Figure 1:
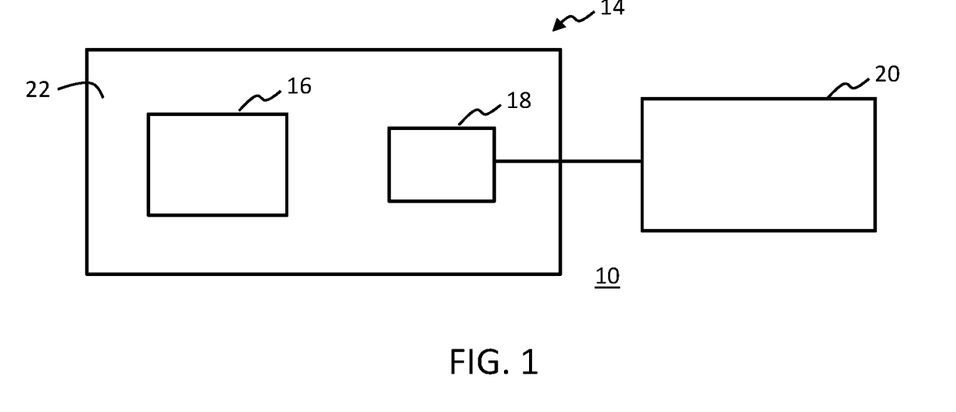
FIG. 1 shows a block diagram of an example oral care system.

FIG. 1 shows a schematic block diagram of components of an example oral care system according to one or more embodiments.

The system 10 comprises a cleaning and/or treatment portion 14 (abbreviated herein: CTP) of an oral care device, at least a section of which is for being received in use in an oral cavity of a user for a cleaning or treatment function.

The CTP 14 comprises a support structure 22 which carries; a magnetic field source 16 for generating a reference magnetic field in the oral cavity when received therein, and a magnetic field sensing arrangement 18, arranged to detect a magnetic field strength of the reference field, or changes therein, at one or more spatial locations.

The system further includes a processing arrangement 20, arranged to receive a sensor output from the magnetic field sensing arrangement 18 and adapted to perform sensing of blood based on the sensor output.

More particularly, it is preferably adapted to detect oral features based on sensing of blood in or on the gum tissue or in the oral cavity, the detection based on the sensor output. For example, it may be adapted to detect abnormal presence or concentration of blood in or on the gum tissue or in the oral cavity, the detection based on analysis of the sensor output.

Embodiments are based on detecting blood features in the oral cavity, or tissue within the oral cavity. This can for example include one or more of: an abnormal presence of blood (e.g. where blood should not normally be), e.g. in the mouth (indicative of bleeding), or abnormal concentration or volume of blood, e.g. in gums (indicative of inflammation) or on the surfaces of gums, e.g. as droplets.

A cleaning and/or treatment portion (abbreviated herein: CTP) 14 means a portion of an oral care device which is designed to be received in the mouth for a cleaning and/or treatment function. For example, it may comprise a toothbrush head. It may comprise the head of a flossing or oral irrigation device. In other examples, it may form a mouthpiece portion of a brushing mouthpiece device. In some cases, the whole oral care device is received in the mouth (e.g. in the case of a cleaning mouthpiece unit). Here the whole device forms the CTP. In use, the CTP 14 may be physically separable from the oral care device 12, e.g. a removable toothbrush head. In other examples it may be integrally comprised by the oral care device.

The support structure may for example comprise a platen of a toothbrush, or a biting surface of a mouthpiece unit, or any other body or structure which may act as a carrier or housing for the magnetic source and magnetic sensing arrangement.

There are different options for the architecture of the system which will be discussed in more detail later.

With regards to the magnetic field source, this may be a passive field source (e.g. a permanent magnet) or an active field source, e.g. a coil, solenoid or an electrode pair. By way of example, a permanent magnet may comprise a ferrite magnet or a rare earth metal based magnet such as alloys of NdFEB or SmCo. By way of a contrary example, a solenoid or loop coil can be driven with a DC current to generate a static magnetic field, or with an AC current to generate an alternating magnetic field.

In general, the reference field may be a static field or a time varying field. e.g. an alternating field. It is preferred that a static field be used. Where a time-varying field source is used. e.g. an alternating magnetic field, the detection criteria may need to be adjusted compared to those of a static field. For example, if a detection criterion comprises detecting a change or variation in detected field strength (for a static field), this may need to be defined as a change or variation in a baseline of the detected field strength, or an envelope of field strength (for an alternating field).

With regards to the magnetic field sensing arrangement 18, this may comprise a single magnetic field sensing element of a plurality of sensing element. It may sense the magnetic field strength at a single location or at a plurality of locations. By way of non-limiting examples, suitable options for sensing the magnetic field include one or more (giant) magneto resistance sensors, or one or more Hall effect sensors. For example, commercially available giant magneto-restrictive (GMR) sensors can be provided with very small dimensions (e.g. in the order of 1×1×0.5 mm) and can operate at very low power levels (e.g. nanowatts at 0.9 Volt).

The magnetic sensing elements of the magnetic sensing arrangement 18 can be disposed on an exposed surface of a support structure 22 of the CTP 14, for example on the platen of a brush. Alternatively, they may be at least partially embedded in the support structure body. The same is true of the magnetic field source. In the case of a brush head for example, they may be positioned at a base of the bristle field, on or in the support structure. In further examples, the magnetic sensing elements and/or the magnetic field source may be embedded or carried by protruding elements which upstand or extend from an upper surface of the support structure 22, and hold the sensing elements and/or field source at an elevated level relative to the support structure. For example, they may be held at, or proximal to, the level of the tips of the bristles (where bristles are included).

Preferably, the magnetic source and the sensing arrangement are positioned so as to be as close as possible to the gum region during use of the CTP 14 for its cleaning or treatment function. This makes it more sensitive to detection of abnormal concentrations of blood in the gums, indicative of gingivitis, or to bleeding from the gums.

An example workflow of the operation of the system can be understood as follows.

The cleaning or treatment portion 14 is received in the oral cavity. The magnetic field source 16 is active (if it is a non-passive field source).

Due to its magnetic properties, any blood (e.g. a blood accumulation) within the area covered by the reference field will interact magnetically with the field and cause changes or disturbances in the shape of the field, or field strength distribution of the field, compared to a state in which there is no external matter in the field. This is detectable by the magnetic field sensing arrangement 18. Depending upon the size, shape and character of the blood feature, the interaction with the reference field will differ and thus will be associated with a different detectable signature or fingerprint in the sensing signal.

Figure 2:
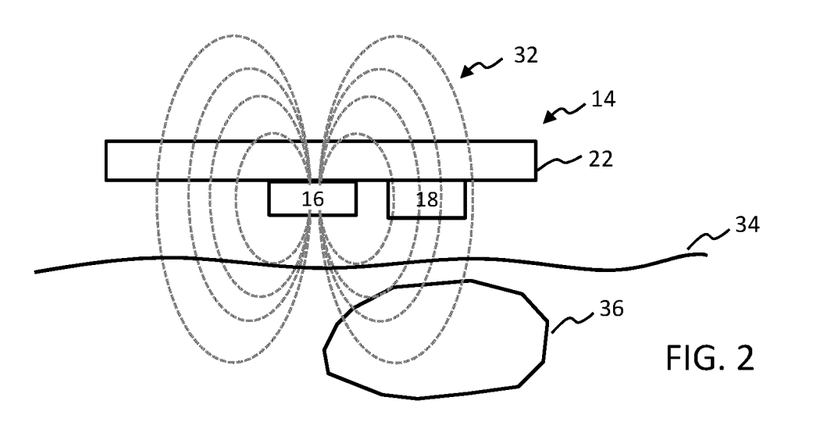
FIG. 2 illustrates an example system in use, with the reference field exposed to normal fluid.
Figure 3:
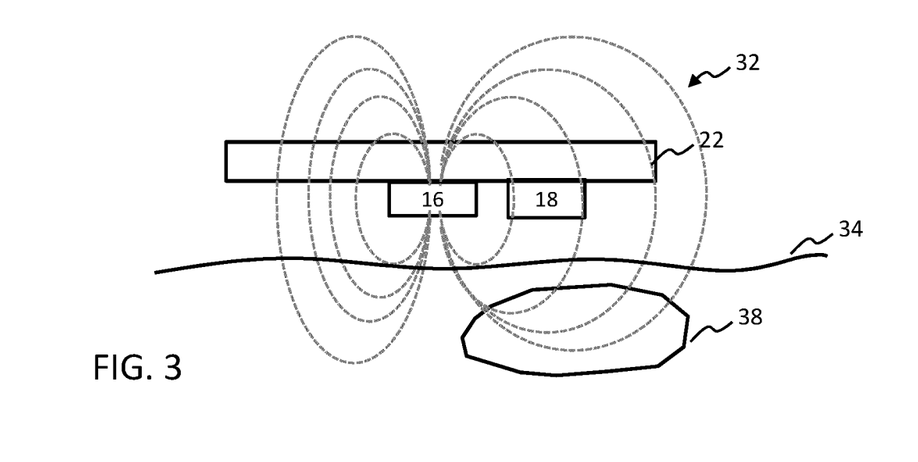
FIG. 3 illustrates an example system in use, with the reference field exposed to blood.

This is illustrated schematically in FIGS. 2 and 3 which show an example support structure 22 of a CTP 14, carrying a field source 16 and a field sensing arrangement 18, being held over an area 34 within the oral cavity. The area might for example be a recess at the base of the mouth, or at the gum line, or any other area. The field source 16 is shown generating a static reference magnetic field 32, the field lines of which are schematically illustrated. FIG. 2 schematically illustrates a region of fluid 36. e.g. saliva, which is brought into the area of the reference field. FIG. 3 schematically illustrates a region of blood 38 which is brought into the area of the field. The region of blood might for example represent a build-up or accumulation of perfused blood within inflamed tissue caused by gingivitis. Due to its magnetic properties (diamagnetic in this example), the blood acts to distort the shape of the field, in particular by extending the field lines along its length. In the illustrated example, this acts to spread the area covered by the field, thus reducing the flux density in the area of the field sensor 18. As a result, the field sensor detects a lower field strength reading. This represents just one example of how a blood feature might distort or influence a field. By contrast, the (non-magnetic) fluid 36 does not have any distorting influence on the field 32, or negligible influence.

The field sensing arrangement 32 senses magnetic field strength at one location or multiple locations. FIG. 3 shows one location for illustration. The sensing data is communicated to the processing arrangement 20 (not shown in FIG. 2 or 3).

The processing arrangement 20 applies at least one detection assessment. This may comprise an algorithm or a set of rules encoded in the programming of the processing arrangement. The processing arrangement may be operable to selectively apply one of a plurality of different detection assessments, each for detecting a different oral abnormality or feature, e.g. a blood feature or property or pathology. Depending upon the feature to be detected, the blood distribution properties associated with that feature can be expected to interact with the reference field in a different way, and thus is associated with different observable sensing signal properties, or changes in sensing signal properties.

A given detection assessment is associated with one or more assessment criteria relating to the field sensing data from the field sensing arrangement 18. This may relate to temporal variations in the field, a spatial distribution of the field across different locations, a threshold magnitude for the field, a threshold change in the field compared to a reference value or distribution, and/or any other criterion as may be desired or required for detecting a particular abnormal state. The processing arrangement 20 may be adapted to communicate with a local or remote datastore which stores the detection criteria. A datastore may be comprised as part of the processing arrangement in some examples, or it may be remote and communicable via a communication interface. Optionally, the processing arrangement may be switchable between different detection modes, each for detecting a different blood abnormality or feature, and wherein in each mode, a different detection assessment is applied for detection. Alternatively, the processing arrangement 20 may be operable to detect any of a plurality of types of abnormality in a single mode.

A successful or positive outcome of the detection assessment may correspond to the meeting of all, or a defined subset of, the detection criteria for that assessment. Optionally, if detection of the relevant feature or abnormality is positive, a notification signal may be generated. This may cause generation of a sensory output via a user output element, such an auditory alert, or illumination of one or more lights, or haptic feedback via a handle of the oral care device for example. Alternatively, the signal may be coupled to a further datastore or analysis module arranged to compile results of the detection for later retrieval and presentation to the user.

In some examples, a datastore may store a record of one or more reference sensing signals associated with normal state of the oral cavity and associated with a clinically abnormal state of the oral cavity. Determination of an abnormality may comprise comparing a detected signal with the reference signals.

There are different options for the structural configuration of the sensing components in the oral cleaning or treatment portion 14. There are also different options for the detection assessments which may be performed, and the related criteria, depending upon the blood feature or abnormality to be detected.

In accordance with at least a first set of embodiments, the magnetic sensing arrangement 18 comprises a single magnetic sensing element, for example in the form of a giant) magneto resistance sensor or a Hall effect sensor. This example is schematically illustrated in FIG. 2 and FIG. 3.

In operation, the CTP 14 is moved by the user across the oral cavity area of interest and the output of the magnetic sensor 18 is monitored by the processing arrangement 20. If the CTP 14 passes over a body area where no major concentrations of blood are present (for example the teeth) there will be little change in the output of the magnetic sensor (see FIG. 2). However, diamagnetic (or paramagnetic) blood will disturb the magnetic field and the sensor output will be modified. In general, the presence of the blood will cause the field lines to spread further, whereby a reduction in (field strength) signal is to be expected (FIG. 3). However, for some other geometries, an increase in field strength signal would also be possible (for example if the sensor 18 is positioned close to the gum and partially surrounded by inflamed, blood rich areas).

Detection may thus be based on sensing a change in the sensed magnetic field. In other words, in this embodiment, detection is based on sensing temporal changes in the sensor output signal, representative of the reference field being passed over an area which contains a relevant blood feature, for example an accumulation of blood, either beneath the tissue surface or in the mouth. In a received signal of magnetic field strength over time from the field sensing arrangement 18, this can be detected as a fluctuation in the field signal. Since the field properties have changed, it is an indication that there is a localized area with a higher concentration of blood than other areas. Based on an assumption that other areas are normal, this means that the localized area has a blood concentration or accumulation outside of normal levels. Thus an abnormality can be detected based on detecting a temporal fluctuation in the field signal. It is noted that in the case of an alternating field, detection may be based on a temporal fluctuation in a baseline of the field signal, or an amplitude or envelope of the field signal.

A fluctuation indicates presence of blood at the instant location of the field sensing arrangement at the time of detecting the fluctuation. This also allows for localization of the blood feature. For instance, sensory feedback could be given as a fluctuation is sensed, so that a user is alerted that the current location of the CTP 14 is a location of a feature such as an abnormality. A fluctuation in this context may mean for example an increase or decrease in the signal by a pre-defined threshold amount within a pre-defined time window. This can be set at a level to rule out simple background fluctuations due to noise.

In accordance with one or more embodiments, the processing arrangement may further comprise a position determining functionality for determining an indication of a position of at least the magnetic sensing arrangement in the mouth at any given time. By way of example, the documents US 2020/069042 and US 2020/022488 each disclose suitable example systems for determining a position of a CTP 14 (e.g. a toothbrush head) within the oral cavity.

The processing arrangement 20 may be adapted to determine a location of a site of blood presence based on identifying a detected location of the magnetic sensing arrangement at the time of detection of the fluctuation in the magnetic signal. This can be used to check that the higher than usual blood presence or accumulation is in fact unusual for the particular location concerned. If blood presence, or high blood concentration, is detected at a location that is not normal (for example while brushing occlusal or facial tooth side) this indicates the blood is abnormal. Additionally or alternatively, it may simply enable precise recording of the locations of each detected abnormality, which may be stored in a datastore for example and retrieved at the end of the use session.

An arrangement with a single magnetic sensor can be prone to noise from magnetic fields caused by external factors (e.g. magnetic shielding materials or even the earth's magnetic field). It also in general may not be able to detect abnormalities if the field source and sensor arrangement are being held static in the mouth, as for example is the case for some types of mouthpiece devices. Thus in accordance with a further set of one or more embodiments, the magnetic field sensing arrangement 18 may comprise a plurality of magnetic field sensing elements.

Figure 4A:
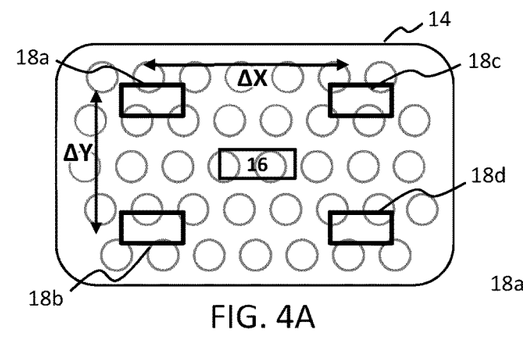
FIG. 4 shows an example cleaning and/or treatment portion of a system comprising a plurality of magnetic sensing elements.
Figure 4B:
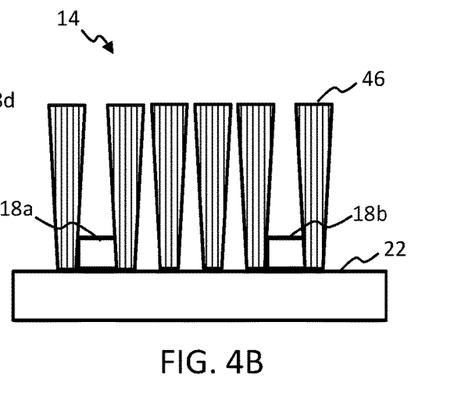

One example is shown in FIGS. 4A and 4B. In this example, the cleaning and/or treatment portion 14 is a brush head for a toothbrush, but the type of cleaning and/or treatment unit is not essential to the technical effect of the embodiment. The magnetic sensing arrangement 18 comprises a set of four magnetic sensing elements, 18a, 18b, 18c, 18b, being spaced from one another, and from the magnetic field source 16. FIG. 4A schematically shows example positions of the sensing elements 18a-18c and the field source 16. The sensing elements are arranged in a 2×2 array formation. The sensing elements have a vertical separation, $\Delta Y$, and a horizontal separation, $\Delta X$, both of which can be adjusted. By way of one non-limiting example, the horizontal spacing may be configured to be approximately half the width of a typical tooth (e.g. around 5-10 mm), while the vertical spacing may be made in order of 10 mm. More or fewer than four sensors may be provided. FIG. 4B schematically shows a side elevation of the arrangement, with the sensor elements (only two 18a, 18b are visible) disposed on a surface of the support structure 22 of the cleaning and/or treatment portion 14 and at a base of the bristle 42 field. In other examples the sensor elements and optionally the field generator could be incorporated into the tips of protruding members which extend to the level of the bristles 46 so that the sensors are closer to the gums during use.

In this set of embodiments, detection of a blood-related feature can be done based on spatial variations in the magnetic field strength detected by different of the sensing elements 18a, 18b, 18c, 18d. For example, a simple asymmetry in the detected field strength between one set of one or more sensing elements located at one region of the support structure 22, and another set of one or more sensing elements which is spaced from the first at another region, indicates that the amount of blood being detected at those two regions is different. Based on an assumption that the region with one of the higher or lower detected field strength is healthy (depending upon the structural configuration, the healthy side could have a higher reading or lower-see discussion above), this means the region with other of the higher or lower detected field strength must be located at a region of abnormal blood concentration. Thus, detection of an abnormality can be made.

Optionally, detection criteria for the detection assessment may include a threshold for the asymmetry of disparity, e.g. a minimum percentage disparity in sensor readings between two sensing locations in order for detection of an abnormality to be made. Optionally, in addition or alternatively, the detection criteria may include a threshold for the level of the sensed field strength at the higher strength sensing location or lower strength sensing location in order for a detection to be made. This can be set at a level that rules out for example detection due to one area of the sensing arrangement 18 simply being overlaid an area of normally zero blood presence, e.g. the tip of a tooth.

Figure 5:
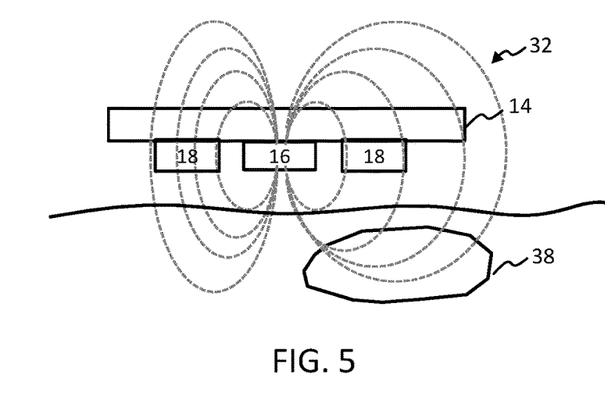
FIG. 5 illustrates use of an example system having a plurality of magnetic sensing elements.

In a simplest case, this set of embodiments may implemented with a sensing arrangement 18 comprising two sensing elements, located spaced from one another in or on the support structure. e.g. on different sides of the support structure. This example is illustrated in FIG. 5. As shown, on the side at which there is presence of an accumulation of blood 38, e.g. due to gingivitis, the blood distorts the field, leading to a higher or lower sensor reading depending upon the sensor positioning (lower in this case). On the other side, a relative higher reading is detected.

Optionally, in this set of embodiments, localization of the abnormality relative to the area of the sensing arrangement may be determined, based upon where the altered field strength is detected. Where there are only two sensors, this can only be done if it is known in advance whether blood will increase or decrease the detected field strength in the relevant area (and this typically will be known). Where there are more than two sensors, it might be done by identifying which of the sensing elements has a field reading which differs from all of the others by some threshold amount and then assuming the abnormal blood feature is located beneath or adjacent the location of this sensing element.

In some examples, an array of sensing elements may be provided, spanning a sensing area of the sensing arrangement. In this case, more precise localization of the abnormality may be possible, by identifying the particular local region of the sensing area at which sensing elements are detecting the disparate field strength (compared to the other areas). The location of this area gives a location of the abnormality relative to the sensing area of the sensing arrangement. In the case of a cleaning or treatment portion that spans a large area of the oral cavity, e.g. a mouthpiece unit, this can allow for precise localization of an abnormality across said whole large area of the mouth. In other cases, it may allow for localization within a more confined region of the mouth spanned by the sensing area.

A size of the detected area of disparate field strength can also be used to estimate a size or extent of the area of abnormal blood presence or concentration, e.g. only a region at the gum-line has bleeding or inflammation, while other areas do not (by way of one example). Thus, an embodiment with a plurality of sensing elements is able to sense a spatial shape, pattern or distribution of blood.

The latter feature may also be used as part of the detection criteria for detecting an abnormality. In some examples, the detection criteria may include detection of a certain spatial distribution of the field strength across the sensing area (across the different sensing locations) of the sensing arrangement 18. For example, a set of one or more reference field distributions or patterns may be stored in a datastore and wherein detection of one or more types or classes of abnormality is dependent upon detecting the relevant reference field distribution.

In certain examples, this embodiment can also incorporate features discussed above relating to detection of a feature or abnormality based on detecting temporal variations or changes in field strength. For example, in some embodiments, detection of an abnormality may be based on detecting temporal changes or variation in a spatial field distribution across the different sensing spatial locations. If the field distribution changes by a defined threshold amount or in a defined way, detection may be triggered. Thus, optionally, detection of an abnormality may be based on a combination of spatial and temporal variations in field strength.

A field distribution in the context of this disclosure may correspond to the relative field levels detected at each of the sensing locations of the sensing elements 18a, 18b, 18c, 18d (relative to one another), or a distribution of the absolute values across the locations.

The magnetic field sensing elements 18a, 18b, 18c, 18d are preferably in a fixed spatial arrangement.

In accordance with either the single sensor or multiple sensor option, the lateral distance between the magnetic sensing element(s) and the magnetic field source may be adjusted to adjust a sensitivity. For example, the system may be made sensitive to blood closer to the (gum) surface by moving the sensor 18 laterally closer to the field source 16, and may be made sensitive to blood further from the surface by moving the sensor further from the field source.

In accordance with either the single sensor element or multiple sensor element option, detection of inflamed gum tissue (or a condition indicative thereof), for example gingivitis, may be performed based on detection of a certain threshold field magnitude or a certain reference change in field shape. This is particularly due to the fact that oxygenated blood is diamagnetic whilst the de-oxygenated blood is paramagnetic. These would distort a field in which they are present in different ways. Thus, based on a set of one or more reference criteria for field magnitude or pattern changes for different of diamagnetic and paramagnetic blood, the system can be adapted to detect a level of oxygenation of the blood. This would increase specificity in detecting Gingivitis, as for Gingivitis, the blood is more de-oxygenated than in healthy gum tissue.

In accordance with one or more embodiments, the oral care device may additionally comprise an electromagnetic cleaning or treatment functionality.

Electromagnetic fields, particularly at radio frequencies (RF), are known to be effective for use in cleaning or treatment of tooth surfaces or gum tissue. For example they can loosen biofilm coverings on tooth surfaces which can actively assist during cleaning of teeth with the cleaning or treatment portion 14. Radio frequencies can also stimulate gum tissue which can have local therapeutic effects. A suitable range of frequencies for the cleaning or treatment mode may be for example between 1 MHz and 10 MHz Thus, in accordance with one or more embodiments, the oral care system may further comprise an electromagnetic (EM) cleaning and/or treatment arrangement 60. The EM cleaning or treatment arrangement 60 may be abbreviated herein: EMCTA.

Figure 6:
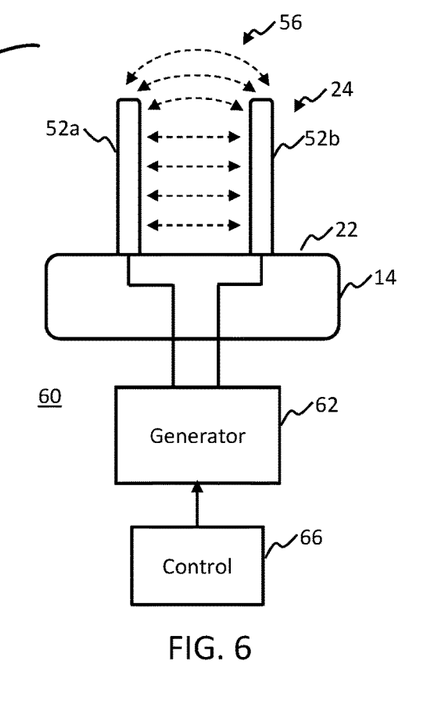
FIG. 6 shows an example electromagnetic cleaning and/or treatment arrangement (EMCTA)

Component parts of an example EM cleaning and/or treatment arrangement 60 are shown in FIG. 6. The arrangement 60 comprises: a conductor arrangement 24, comprising one or more conductive elements 52. It further comprises a signal generator 62 adapted to generate a radiofrequency (RF) and/or microwave frequency alternating electromagnetic field 56 when said generator 62 is operatively coupled to the conductor arrangement 24.

Optionally, the arrangement 60 may comprise a controller 66 operatively coupled in use with the signal generator 62 for selectively activating the generator in a cleaning or treatment mode. The controller may implement the cleaning or treatment mode by controlling operation of the signal generator when a cleaning or treatment mode is selectively activated. In some examples, activation of a cleaning or treatment mode may be user-actuated, e.g. with a physical button on the device, or external thereto, or with operatively coupled software (e.g. a smartphone app). The controller may be comprised by the oral care device, or may be external thereto, but operatively connected to the signal generator. In other examples, the signal generator itself may comprise a processor or IC chip permitting local activation and implementation of a cleaning or treatment mode.

The generator 62 is an oscillatory signal generator, e.g. an oscillator. It generates an alternating drive signal which is coupled to the conductor arrangement 24, causing emission of EM radiation, or generation of an EM field. The oral care device may comprise a local power store, e.g. a battery, for powering the generator 62.

The conductor arrangement 24 may for example comprise a pair of electrodes 52 driven with cyclically opposing polarities by the generator 62, to cause generation of an alternating field between the electrodes. This option is shown in FIG. 6, where the conductor arrangement 24 comprises a pair of electrodes 52a, 52b. These may be laminar in shape in some examples. An alternative possibility is use of one or more inductive coils or wire loops, driven with an alternating current to induce generation of an alternating field along an axial direction of the loop or coil.

The conductor arrangement may be comprised or carried by the oral cleaning or treatment portion (CTP) 14, e.g. by the support structure 22. Optionally, the signal generator 62 may be comprised by a body portion of the oral cleaning device. The conductor arrangement 24 and signal generator 62 may be permanently electrically coupled or may be releasably electrically coupleable, for example with connection becoming established upon mechanical coupling of the CTP to a body portion of the oral cleaning device.

In accordance with one set of embodiments, the signal generator 62 and conductor arrangement 24 may provide the magnetic field source 16. In other words, the EMCTA 60 is used to generate the reference magnetic field 32.

In some examples of this, the magnetic component of the EM alternating field 56 generated in the cleaning or treatment mode provides the reference magnetic field 32 for use in sensing blood. The reference field is thus formed by the EM cleaning or treatment field. The EM cleaning and blood detection can thus be done simultaneously. In this case, the reference field is an alternating AC field.

In accordance with a further set of examples, the blood sensing and EM cleaning and/or treatment functions are performed in separate modes. For example, the controller 66 is further selectively configurable in a blood sensing mode in which the signal generator 62 is controlled to generate a different magnetic or electromagnetic field using the conductor arrangement 24, for use as the reference field 32. Thus in this case, cleaning and the sensing cannot be done absolutely simultaneously. However, it would be possible (optionally) to generate the cleaning and sensing fields in alternating switching fashion, e.g. in alternate duty cycle phases of a duty cycle control, so that they can operate quasi simultaneously.

The different field may be a DC field in some examples. This may be achieved through switching in a rectifier between the generator 62 and conductor arrangement (preferably a coil) when switching to blood sensing mode and thereby driving the coil with a DC current. Additionally or alternatively, the different field may be a lower frequency alternating field to the cleaning and/or treatment field.

It is also possible to generate a cleaning and/or treatment field 56 and a different sensing reference field 32 exactly simultaneously in a hybrid cleaning/treatment and sensing mode, using the same generator 62, but using separate conductor arrangements 24 for generating the respective fields. This can be done through providing a rectifier between the oscillatory generator 62 and the conductor arrangement (e.g. loop coil) used to generate the reference field 32, while the generator 62 is connected without rectifying components to the conductor arrangement 24 of the EM cleaning and/or treatment arrangement 60. This allows a DC reference field 32 to be created at the same time as an AC cleaning/treatment field 56. However, it is possible in this case that the fields might interfere with another and thus the detection criteria used to detect abnormal blood features would need to be configured to account for the potential change in the sensing field characteristics, e.g. a separate set of detection criteria for when the hybrid cleaning and sensing mode is active.

Figure 7:
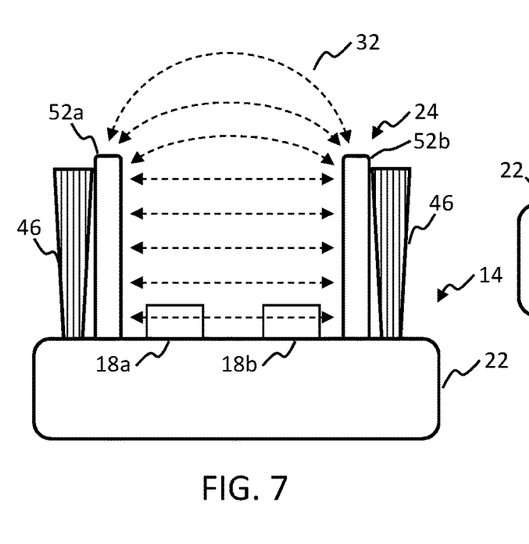
FIG. 7 shows part of an example system which comprises an EMCTA.
Figure 8:
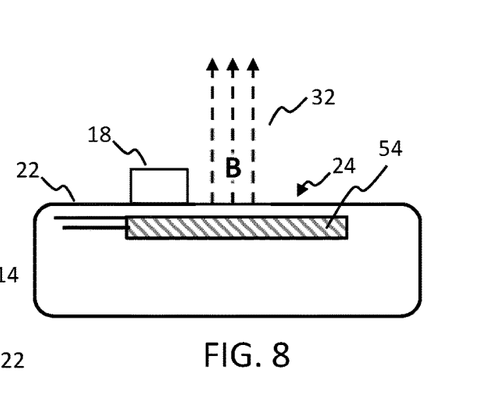
FIG. 8 shows part of a further example system which comprises an EMCTA.

FIG. 7 and FIG. 8 schematically illustrate two examples in which the EMCTA 60 components are used to generate the reference magnetic field 32. In the example of FIG. 7, the conductor arrangement 24 comprises a pair of electrodes 52a, 52b. These may be covered with a protective coating in some examples. They may be embedded within resilient protruding members in some examples. The electrodes are provided protruding from a surface of the support structure 22 of the oral cleaning or treatment portion 14. An alternating electromagnetic field is generated between the electrodes 52 through application of an AC voltage or current across the electrodes by the generator 62 (not shown in FIG. 7). The magnetic components of this AC EM field form the reference field 32. Two example sensor elements 18a 18b of a magnetic sensing arrangement 18 are shown disposed on the surface of the support structure 22 within the reference field 32. These may instead be provided at the level of the tips of the electrodes 52 and/or a bristle field (where one is included).

In the example of FIG. 8, the conductor arrangement 24 comprises a loop coil 54. In a blood sensing mode, this may be driven with a DC current to generate a static reference magnetic field 32. In a cleaning and/or treatment mode, it may be driven with an AC current to generate an alternating EM field. Alternatively, the alternating AC field for cleaning and/or treatment may be used also for the reference field. For illustration, a single sensing element 18 is shown within the reference field, although more may be provided in other examples.

Optionally, there may be provided a second conductor arrangement (e.g. coils instead of electrodes) and optionally a second signal generator for generating the magnetic field for use in blood detection. Generation of the reference magnetic field may be completely separate from the EMCTA components in some examples, i.e. there is a separate field source for the reference field.

In compatibility with any of the above described options, in accordance with one or more embodiments, the magnetic field sensing arrangement 18 may be arranged to be powered through inductive or capacitive coupling of energy from the EM field 56 generated by the EMCTA signal generator 62 and conductor arrangement 24.

This could be done within the cleaning and/or treatment mode, or within the dedicated sensing mode discussed above. Thus here, the field being used to transfer the power to the sensors is the same field being used to perform the cleaning and/or treatment function, and/or to perform the sensing function. Alternatively, it could be done within a further dedicated power transfer mode, in which the controller 66 controls generation of an EM field using the conductor arrangement 24 for the primary purpose of powering the magnetic sensing arrangement 18. Here, EM cleaning and/or treatment is not active during the power transfer mode. A separate field may be generated for the reference field 32.

This set of embodiments has the advantage that no additional active or powered components need to be integrated in the oral care device or system in order to power the sensors (they are inherently powered by means of the power source for the EMCTA 60. Additionally, it is not necessary to run separate power supply lines to the active field sensing arrangement. If the main power source for the oral care device is for example in a handle portion, while the CTP 14 is at a head area, this is a significant simplification in manufacture.

Figure 9:
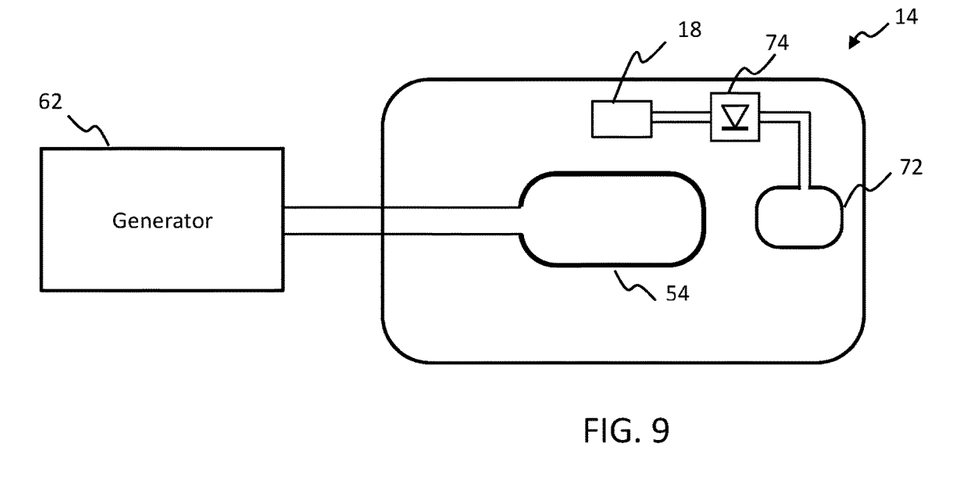
FIG. 9 shows part of a further example system which comprises an EMCTA, and wherein the magnetic sensing arrangement is inductively powered by the EMCTA.

Inductive or capacitive coupling can be done through providing a transmitting inductive coil or a transmitting pair of capacitor plates connected across the oscillatory generator 62, and a receiving inductive coil or a receiving pair of capacitor plates (respectively) connected across the magnetic sensing arrangement (or across a single magnetic sensing element in some examples), and with a rectifier provided between the receiving coil or plates and the sensor. An example is schematically illustrated in FIG. 9 which shown a transmitting inductive coil 54 connected across the generator 62, and a receiving inductive coil 72 connected across an example magnetic sensing arrangement or element 18, with a rectifier 74 between the receiving coil 72 and the magnetic sensing element 18. The transmitting inductive coil and receiving inductive coil may be arranged in axial alignment (not shown in FIG. 9), and spaced from one another axially, in electromagnetic coupling arrangement. Where capacitive coupling is used, the transmitting capacitive plates and receiving capacitive plates may be arranged in facing relationship, and spaced from one another, in electromagnetic coupling arrangement.

Additionally or alternatively, in cases where the reference field 32 is not generated by the EMCTA 60, it would also be possible to provide the magnetic field source 16 (in cases where it is an active field source) arranged to be powered through inductive or capacitive coupling of energy from the EM field generated by the signal generator and conductor arrangement.

For example, an active field source 16 may be provided, e.g. a DC or AC driven coil or solenoid, and wherein the driving of the active field source is powered by the RF generator. For example, it may be powered through inductive or capacitive coupling of electrical energy from the RF conductor arrangement (capacitively if the conductor arrangement comprises electrodes; inductively if the conductor arrangement comprises one or more coils).

Depending upon the particular abnormality which is to be detected, the processing of the sensor signal and/or the detection criteria applied may vary.

In accordance with one or more embodiments, the processing arrangement 20 may be arranged to receive a sensor signal of magnetic field strength over time for the one or more sensing locations of the sensing arrangement 18, and is adapted to process the signal to remove frequency components within a pre-defined range of frequency components associated with a defined heart rate frequency.

This embodiment is helpful for distinguishing static blood (such as in droplets on the surface of the gum tissue) from flowing blood. This is useful in detection of pockets of blood or blisters from inflamed tissue, for example associated with gingivitis, as the former is characterized by a build-up of static blood in the inflamed tissue.

For example, it is known from other technical fields, not related to oral care, that a magnetic field can be used as part of a device for sensing a heart-beat. Even in places where there are no major veins and arteries (e.g. the lung surface) there is still some blood perfused into the skin which may also produce a signal in a magnetic sensor. Thus, inflamed tissue due to gingivitis would also be expected to exhibit some blood-flow related signal components. In order to eliminate these signal components, and isolate components related to the static blood. e.g. droplets on the gum surface or in pockets or blisters, the sensor output may be analyzed as a function of frequency, and the frequency components approximately matching a heartrate frequency (e.g. 0.5-5 Hz. e.g. 1-3 Hz) removed or filtered. One or more band-pass filters may be used for example. By eliminating these components, the remaining signal is representative of the static blood, making the output of the sensor more specific to unwanted blood in the mouth or gums as opposed to arterial blood in the gums.

In some examples, the oral care device may include a heart rate sensing element. e.g. embodied in a handle portion of the device. The pre-defined range of frequencies for filtering the magnetic sensing signal may be set based on the detected heart rate.

It is noted that where the reference field 32 is an alternating field, it may be that the blood flow causes oscillation in the baseline or envelope of the (alternating) sensor signal. Thus, here the spectral analysis and filtering may be applied to the baseline or envelope of the signal. For example, the baseline or envelope signal may be extracted first from the raw sensing signal.

In accordance with one or more embodiments, the processing arrangement 20 may be arranged to receive a sensor signal of magnetic field strength over time for the one or more sensing locations of the sensing arrangement 18, and to detect presence of inflamed gum tissue (or a condition indicative thereof) based on an amplitude of oscillations the signal (or in an envelope or baseline of the signal in the case of an alternating reference field), or based on a magnitude of a baseline of the signal.

This can be useful for detecting inflamed tissue (or a condition indicative thereof). For example, gingivitis has been found in studies to be associated with increased blood flow in the area of the affected tissue. For example, in one study, it has been found that blood flow through gums with moderate gingivitis and periodontal disease is elevated by at least 50%. This leads to a change in the baseline of the sensor signal, since there is a greater concentration or amount of blood in a given area, leading to a greater distortion in the reference field. Thus changes in the baseline can be used to detect inflamed tissue. Additionally, presence of inflamed tissue can lead to changes in the amplitude of oscillations in the signal. For example, the oscillation amplitude may decrease since more blood is retained in the inflamed tissue between blood pulses, and so the cyclical variation in blood volume in the given area is less. Thus the oscillation amplitude is decreased. In other cases, the amplitude may increase, due to increased blood flow in the inflamed area. Pre-stored detection criteria may be applied which define threshold changes in the baseline and/or oscillation amplitude, depending upon the particular tissue inflammation feature being detected, and the structure and intended operation of the device.

In accordance with one or more embodiments, the processing arrangement may be arranged to receive a sensor signal of magnetic field strength over time for the one or more locations from the sensing arrangement, and is adapted to detect presence of blood in fluids within the oral cavity based on processing the magnetic field signal to extract frequency components above 10 Hz.

This can be useful in cases in which the sensing is done during normal use of the oral care device, and where the oral care device is adapted to actuate an oscillation or vibration of at least a portion of the CTP (for example, a powered toothbrush with oscillating head). In the presence of oscillation of the cleaning or treatment unit, contacting fluids in the mouth exhibit turbulence motion with high frequencies. This can be used to isolate signal components associated with (magnetic) blood in the oral cavity fluids, rather than normal blood flow in the tissue (with much lower frequencies corresponding to heart rate. e.g. in the order of 0.5-5 Hz).

For example, free blood in toothpaste may be disturbed by high frequency sonic or rotation oscillation motions (e.g. in the order of 80-250 Hz). Under normal physiological conditions, the blood flow in capillaries has a pulsation frequency of approximately 0.5-3 Hz, whereas under for example sonic motion, turbulent flow can be expected having motion frequencies up to 80-100 Hz, about 2-3 orders of magnitude higher. Thus, the processing arrangement 20 may be adapted to apply a high pass filter or otherwise select a higher frequency band of the sensing signal to be analyzed to differentiate blood within in toothpaste during brushing from blood flow through the gum tissue.

In accordance with one or more embodiments, detection results collected over a plurality of different sensing sessions (e.g. a plurality of different use sessions of the oral care system) may be stored in a local or remote datastore, to enable longitudinal monitoring of oral health. For example, gingivitis is known to recur periodically, for example following a period of less strict dental hygiene. A longitudinal measurement of the distribution of blood in the mouth would therefore be of value for identification of recurrence of gingivitis. Any of the approaches described above could be tracked across a series of oral care (e.g. brushing) sessions and the (re)appearance of unexpected presence or concentrations of blood in the mouth or gums may be flagged, and an alert message generated to alert a user or dental practitioner.

There are different options for the architecture of the system 10 which is provided by the invention. The system includes a cleaning and/or treatment portion (CTP) 14 for an oral care device, at least a section of which is for being received in an oral cavity of a user for a cleaning or treatment function. The magnetic field source 16 and the magnetic field sensing arrangement are carried by or comprised by a support structure of the CTP 14. The CTP which is thus provided may be a separable cleaning or treatment unit which, in use of the system, is designed to releasably couple to a further body portion of an oral care device 12. For example, the CTP 14 may be a removable toothbrush head attachment for a powered toothbrush. An example in shown schematically in FIG. 10A and FIG. 10B. In this example, the processing arrangement is provided integrated in the (body portion 15 of) the oral care device 12. The CTP 14 is a toothbrush head in this example, and the support structure is the platen 22 of the toothbrush head. The head is releasably coupleable with the body portion 15. The body portion forms a handle.

Figures 10A, 10B:
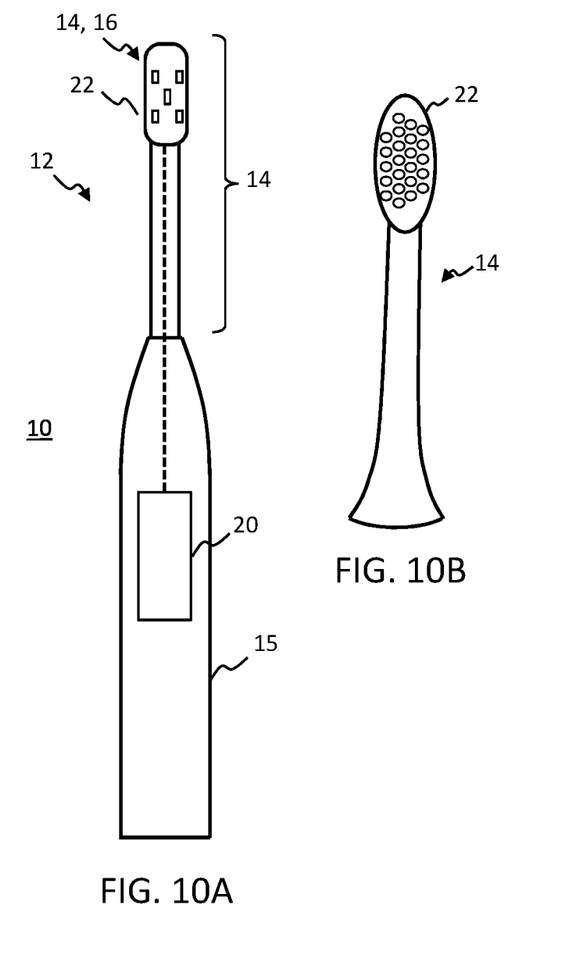
FIG. 10 illustrates an example oral care system in which a processing arrangement is integrated in the oral care device.

A signal connection is provided between the processing arrangement 20 integrated in the body portion 15 of the oral care device 12 and the sensing arrangement 18 integrated in the CTP 14. If the field source 16 is an active field source, a power supply line may be provided between a driver or power unit in the body portion 15 and the field source 16 in the CTP. The signal connection, or electrical connection, is established when the brush head 14 is connected or mated to the body portion 15. The device may further include an actuation mechanism for applying a vibration or oscillation to the brush head in use. A toothbrush is only one example of a suitable oral care device. Other examples include a brushing mouthpiece unit, and oral irrigator, or a powered flossing device.

Figure 11:
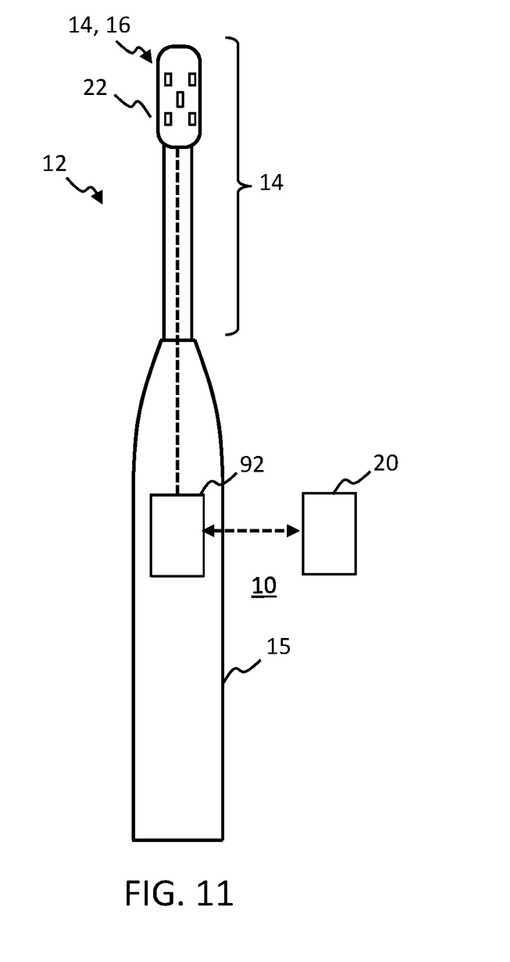
FIG. 11 illustrates a further example oral care system comprising a processing arrangement separate from the oral care device.

In some embodiments of the system, the whole oral care device 12 may be provided. However, at minimum, just the cleaning and/or treatment portion (CTP) 14 and the processing arrangement 20 need to be provided, wherein the CTP is configured for releasably coupling to a body portion 15 of an oral care device when in use. For example, in some embodiments, the processing arrangement 20 may be comprised in a separate device or unit from the oral care device. An example of this arrangement is shown schematically in FIG. 11. By way of one example, the processing arrangement 20 could be provided by the native processing components of a mobile computing device such as a smartphone, wearable computing device (e.g. smartwatch) or tablet computer. The system 10 may in this case include a communication interface 92 to which the sensor output signal of the sensing arrangement 16 is coupled, and arranged for communicating the sensor output signal to the processing arrangement 20 in the separate unit (e.g. mobile computing device). This may be a wireless communication interface 92, e.g. employing Bluetooth, W-Fi, wireless LAN, or even a wired (or other physical) connection in other examples.

In some examples, the CTP 14 may form an integral part of the oral care device 12, for example in the case of a brushing mouthpiece device. In this case, providing the CTP necessitates providing the whole oral care device.

Examples in accordance with a further aspect of the invention provide a method of sensing in an oral cavity of a user. The method comprises: generating a reference magnetic field in the oral cavity; sensing a magnetic field strength of the reference field at one or more spatial locations within the oral cavity to generate a sensing output signal; and performing sensing of blood in gum tissue or in the oral cavity, based on analysis of the sensing output signal. The method further comprises generating a data output based on the sensing.

The method may further comprise detecting one or more blood-related features in the oral cavity or the gums, based on the analysis of the sensing output signal.

The one or more features may correspond by way of example to (health or medical) abnormalities in the gums or in the oral cavity based on the analysis of the sensing output signal, for example abnormal presence or concentration of blood in gum tissue or in the oral cavity. This detection may be based on application of one or more detection criteria related to characteristics or properties of the sensing output signal.

Examples in accordance with a further aspect of the invention provide a computer program product comprising computer program code, the computer program code being executable on a processor. When the processor is operatively coupled with a magnetic field sensing arrangement arranged to sense a magnetic field strength or changes therein at one or more spatial locations in an oral cavity, responsive to generation of a reference magnetic field in the oral cavity by a field source, the code is configured to cause the processor to: receive a sensor output from the magnetic field sensing arrangement indicative of a magnetic field strength or changes therein of the reference field at one or more spatial locations in the oral cavity; and performing sensing of blood in gum tissue or in the oral cavity based on analysis of the sensor output. The code may further cause the processor to generate a data output indicative of the sensing.

The code may further cause the processor to detect one or more blood-related features in the oral cavity or the gums, based on the analysis of the sensing output signal.

The one or more features may correspond by way of example to (health or medical) abnormalities in the gums or in the oral cavity based on the analysis of the sensing output signal, for example abnormal presence or concentration of blood in gum tissue or in the oral cavity. This detection may be based on application of one or more detection criteria related to characteristics or properties of the sensing output signal Embodiments of the invention described above employ a processing arrangement. The processing arrangement may in general comprise a single processor or a plurality of processors. It may be located in a single containing device, structure or unit, or it may be distributed between a plurality of different devices, structures or units. Reference therefore to the processing arrangement being adapted or configured to perform a particular step or task may correspond to that step or task being performed by any one or more of a plurality of processing components, either alone or in combination. The skilled person will understand how such a distributed processing arrangement can be implemented.

The one or more processors of the processing arrangement can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. An oral care system, comprising:
    an oral care device having a cleaning and/or treatment portion, at least a section of the cleaning and/or treatment portion for being received in an oral cavity of a user, the cleaning and/or treatment portion comprising:
        a magnetic field source for generating a reference magnetic field in the oral cavity when received therein, and
        a magnetic field sensor arrangement, arranged to detect a magnetic field strength of the reference field, or changes therein, at one or more locations; and
    a processor in communication with the magnetic field sensor arrangement to receive a sensor output from the magnetic field sensor arrangement and adapted to analyze the sensor output to determine the presence of blood in gum tissue or in the oral cavity.

2. An oral care system as claimed in claim 1, wherein the processor is adapted to detect one or more pre-determined features of the sensor output based on application of one or more pre-determined detection criteria related to characteristics of the sensor output.

3. An oral care system as claimed in claim 2, wherein the processor determines at least one chosen from the group consisting of: gum inflammation, a condition indicative of gum inflammation, static blood on a surface of the gums, static blood at a gum-line between teeth and gums, and bleeding.

4. An oral care system as claimed in claim 1, wherein the processor is adapted to detect variations in the magnetic field detected at the magnetic field sensor arrangement.

5. An oral care system as claimed in claim 4, wherein the magnetic field sensor arrangement comprises a plurality of magnetic field sensors, disposed spaced from one another, and wherein a spatial variation in the magnetic field strength is detected based on variations in magnetic field strength detected by different ones of the sensors.

6. An oral care system as claimed in claim 5, wherein the processor is arranged to receive a sensor signal of magnetic field strength over time for the one or more locations, and detect one or more features based on a detected temporal fluctuation in the signal.

7. An oral care system as claimed in claim 1, wherein the cleaning and/or treatment portion comprises:
    an electromagnetic cleaning and/or treatment arrangement comprising:
        a conductor arrangement-comprising one or more conductive elements;
        a signal generator adapted to generate a radiofrequency and/or microwave frequency alternating electromagnetic field when said generator is operatively coupled to the conductor arrangement; and
        a controller, operable in at least a cleaning and/or treatment mode in which the controller is adapted to control the signal generator to generate an alternating electromagnetic field using the conductor arrangement, for performing an oral cleaning or treatment function when the conductor arrangement is received in the oral cavity.

8. An oral care system as claimed in claim 7, wherein the signal generator and conductor arrangement provide the magnetic field source for generating the reference magnetic field.

9. An oral care system as claimed in claim 8, wherein:
    the magnetic component of the alternating EM field generated in the cleaning and/or treatment mode provides the reference magnetic field; or
    the controller is further selectively configurable in a blood sensing mode in which the signal generator is controlled to generate a different magnetic or electromagnetic field using the conductor arrangement, for use as the reference field.

10. An oral care system as claimed in claim 8, wherein magnetic field sensor arrangement is powered through inductive or capacitive coupling of energy from the EM field generated by the signal generator and conductor arrangement of the electromagnetic cleaning and/or treatment arrangement.

11. An oral care system as claimed in claim 1, wherein the processor is arranged to receive a sensor signal indicative of magnetic field strength over time for the one or more locations from the magnetic field sensor arrangement, and is adapted to process the signal to remove frequency components within a pre-defined range of frequencies.

12. An oral care system as claimed in claim 1, wherein the processor is arranged to receive a sensor signal of magnetic field strength over time for the one or more locations from the magnetic field sensor arrangement, and is adapted to determine presence of blood in fluids within the oral cavity based on processing the magnetic field signal to extract frequency components above 10 Hz, preferably above 50 Hz.

13. An oral care system as claimed in claim 1, wherein the processor is arranged to receive a sensor signal of magnetic field strength over time for the one or more locations from the magnetic field sensor arrangement, and to determine the presence of inflamed gum tissue based on an amplitude of oscillations in the signal and/or based on a level of a baseline of the signal.

14. An oral care system as claimed in claim 1, wherein the cleaning and/or treatment portion is releasably couplable with a further portion of the oral care device, wherein the further portion comprises the processor.

15. A method of sensing in an oral cavity comprising:
    generating a reference magnetic field in the oral cavity;

detecting a magnetic field strength of the reference field at one or more spatial locations within the oral cavity to generate a magnetic field strength signal;

sensing blood in gum tissue or in the oral cavity, based on analysis of the magnetic field strength signal, and generating a data output based on the sensing.

16. A non-transitory computer-readable medium containing instructions which when executed on a processor which is operatively coupled with a magnetic field sensor arrangement arranged to sense a magnetic field strength or changes therein at one or more spatial locations in an oral cavity, responsive to generation of a reference magnetic field in the oral cavity by a field source, performs a method comprising:

receiving a magnetic field strength signal from the magnetic field sensor arrangement indicative of a magnetic field strength or changes therein of the reference field at one or more spatial locations in the oral cavity;

determining blood in gum tissue or in the oral cavity, based on analysis of the magnetic field strength signal, and generating a data output indicative of the determination.

17. The oral care system of claim 14 wherein the further portion of the oral care device comprises a handle.

* * * * *